US010550797B2

(12) United States Patent
Howarth et al.

(10) Patent No.: US 10,550,797 B2
(45) Date of Patent: Feb. 4, 2020

(54) TURBINE ENGINES WITH VARIABLE AREA NOZZLE

(71) Applicant: MRA Systems, Inc., Baltimore, MD (US)

(72) Inventors: Graham Frank Howarth, Middletown, DE (US); David Patrick Calder, Baltimore, MD (US)

(73) Assignee: MRA Systems, LLC, Norwalk, CT (US)

( * ) Notice: Subject to any disclaimer, the term of this patent is extended or adjusted under 35 U.S.C. 154(b) by 254 days.

(21) Appl. No.: 15/546,292

(22) PCT Filed: Feb. 11, 2015

(86) PCT No.: PCT/US2015/015473
§ 371 (c)(1),
(2) Date: Jul. 26, 2017

(87) PCT Pub. No.: WO2016/130120
PCT Pub. Date: Aug. 18, 2016

(65) Prior Publication Data
US 2018/0017020 A1 Jan. 18, 2018

(51) Int. Cl.
*F02K 3/075* (2006.01)
*F02K 3/06* (2006.01)
(Continued)

(52) U.S. Cl.
CPC .............. *F02K 3/075* (2013.01); *B64D 29/06* (2013.01); *F02K 1/06* (2013.01); *F02K 1/08* (2013.01);
(Continued)

(58) Field of Classification Search
CPC ... F02K 3/075; F02K 1/06; F02K 1/08; F02K 1/085; F02K 1/10; F02K 1/11; F02K 1/12; F02K 1/1207–1292
See application file for complete search history.

(56) References Cited

U.S. PATENT DOCUMENTS 3,261,164 A * 7/1966 Tumicki .................... F02K 1/06
239/265.37
3,279,192 A * 10/1966 Hull, Jr. .................. F02K 1/085
239/265.43
(Continued)

FOREIGN PATENT DOCUMENTS

GB          1083738 A       9/1967
JP        H09-195853 A      7/1997
(Continued)

OTHER PUBLICATIONS

International Search Report and Written Opinion issued in connection with corresponding PCT Application No. PCT/US2015/015473 dated Nov. 26, 2015.
(Continued)

*Primary Examiner* — Steven M Sutherland
(74) *Attorney, Agent, or Firm* — McGarry Bair PC

(57) ABSTRACT

A turbine engine having an engine core, an inner cowl radially surrounding the engine core, an outer cowl radially surrounding the inner cowl and spaced from the inner cowl to form an annular passage between the inner and outer cowls that defines a nozzle, at least one control surface provided on the inner cowl and movable between a retracted position, where the nozzle has a first cross-sectional area, and an extended position where the nozzle has a second cross-sectional area that is less than the first cross-sectional area and an actuator operably coupled to the control surface
(Continued)

and configured to move the control surface to control the cross-sectional area of the nozzle.

14 Claims, 5 Drawing Sheets

(51) Int. Cl.
    *F02K 1/06*     (2006.01)
    *F02K 1/08*     (2006.01)
    *B64D 29/06*     (2006.01)
    B64D 27/16     (2006.01)
    F02C 3/04     (2006.01)

(52) U.S. Cl.
    CPC ............... *F02K 1/085* (2013.01); *F02K 3/06* (2013.01); *B64D 27/16* (2013.01); *F02C 3/04* (2013.01); *F05D 2220/323* (2013.01); *F05D 2260/50* (2013.01); *F05D 2270/20* (2013.01)

(56) References Cited

U.S. PATENT DOCUMENTS

| | | | | |
|---|---|---|---|---|
| 3,380,663 A * | 4/1968 | Jumelle | ..................... | F02K 1/10 239/265.41 |
| 3,598,318 A * | 8/1971 | Schiel | ..................... | F02K 1/06 239/265.13 |
| 3,599,432 A * | 8/1971 | Ellis | ..................... | F02K 1/645 60/226.1 |
| 3,721,389 A | 3/1973 | MacKinnon et al. | | |
| 3,756,026 A * | 9/1973 | Timms | ..................... | F02K 1/06 60/226.1 |
| 3,785,567 A | 1/1974 | Fisher | | |
| 3,913,626 A * | 10/1975 | McMurtry | ................ | F02K 1/06 138/37 |
| 3,967,443 A | 7/1976 | McMurtry | | |
| 2008/0069687 A1* | 3/2008 | Lace | ..................... | F01D 17/162 415/145 |
| 2009/0208328 A1 | 8/2009 | Stern | | |
| 2010/0043394 A1 | 2/2010 | Pero | | |
| 2013/0008147 A1 | 1/2013 | Todorovic et al. | | |
| 2013/0306755 A1 | 11/2013 | Dittmann et al. | | |

FOREIGN PATENT DOCUMENTS

| | | |
|---|---|---|
| JP | H11-159399 A | 6/1999 |
| JP | 2001-050110 A | 2/2001 |
| WO | 2015011198 A1 | 1/2015 |

OTHER PUBLICATIONS

International Preliminary Report on Patentability issued in connection with corresponding PCT Application No. PCT/US2015/015473 dated Aug. 15, 2017.

Machine Translation and Notification of Reasons for Refusal issued in connection with corresponding JP Application No. 2017-541032 dated Dec. 4, 2018.

* cited by examiner

TURBINE ENGINES WITH VARIABLE AREA NOZZLE

BACKGROUND OF THE INVENTION

Contemporary aircraft engine and nacelle structures typically include a fixed geometry fan exhaust nozzle formed by the outer cowl structure and the inner fixed engine cowl. The geometry of the exhaust nozzle is often a compromise between providing a satisfactory flow path for engine performance during several phases of flight, including the cruise, take-off, and landing phases. In order to achieve better engine performance across the different flight phases, a wide variety of solutions for exhaust nozzle geometry have been investigated; however, proposed solutions to the problem have proven to be complex and costly.

BRIEF DESCRIPTION OF THE INVENTION

In one aspect, an embodiment of the invention relates to a turbine engine having an engine core, an inner cowl radially surrounding the engine core, an outer cowl radially surrounding the inner cowl and spaced from the inner cowl to form an annular passage between the inner and outer cowls that defines a nozzle, at least one control surface provided on the inner cowl and movable between a retracted position, where the nozzle has a first cross-sectional area, and an extended position where the nozzle has a second cross-sectional area that is less than the first cross-sectional area and an actuator operably coupled to the control surface and configured to move the control surface to control the cross-sectional area of the nozzle.

DESCRIPTION OF EMBODIMENTS OF THE INVENTION

Figure 1:
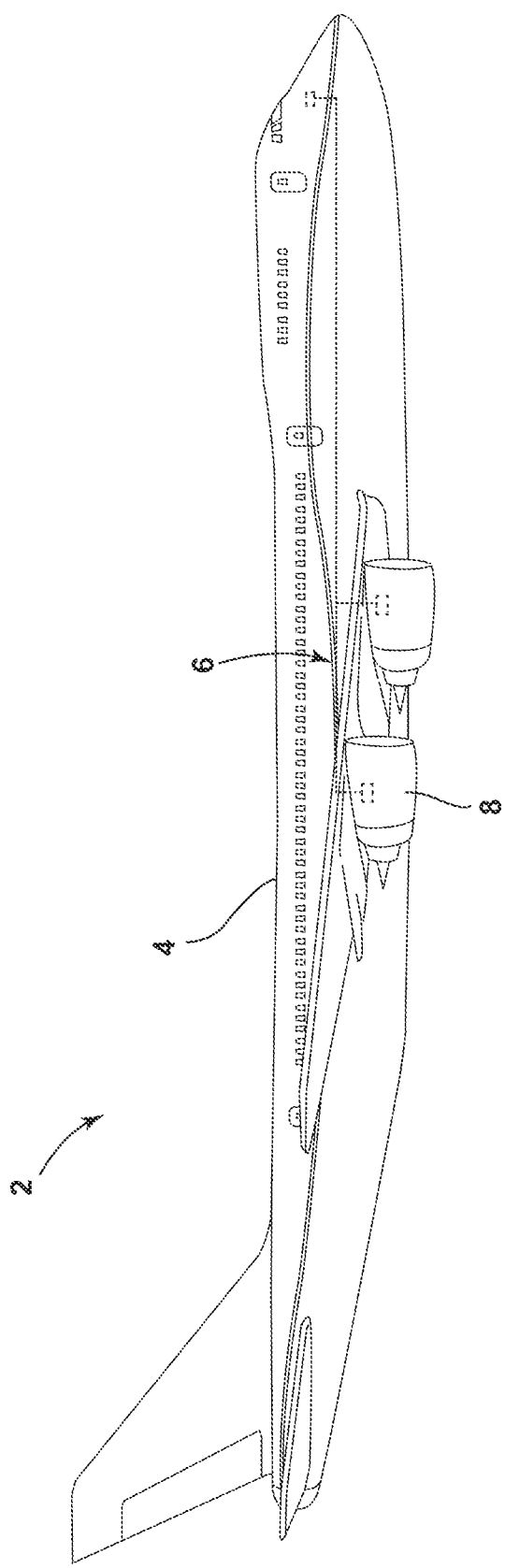
FIG. 1 is a side view of an aircraft with multiple turbine engine assemblies.

FIG. 1 illustrates an aircraft 2 having a fuselage 4 with wing assemblies 6 extending outward from the fuselage 4. One or more turbine engine assemblies 8 may be coupled to the aircraft 2 to provide propulsion therefore. While a commercial aircraft 2 has been illustrated, it is contemplated that embodiments of the invention may be used in any type of aircraft, for example, without limitation, personal aircraft, business aircraft, and military aircraft.

Figure 2:
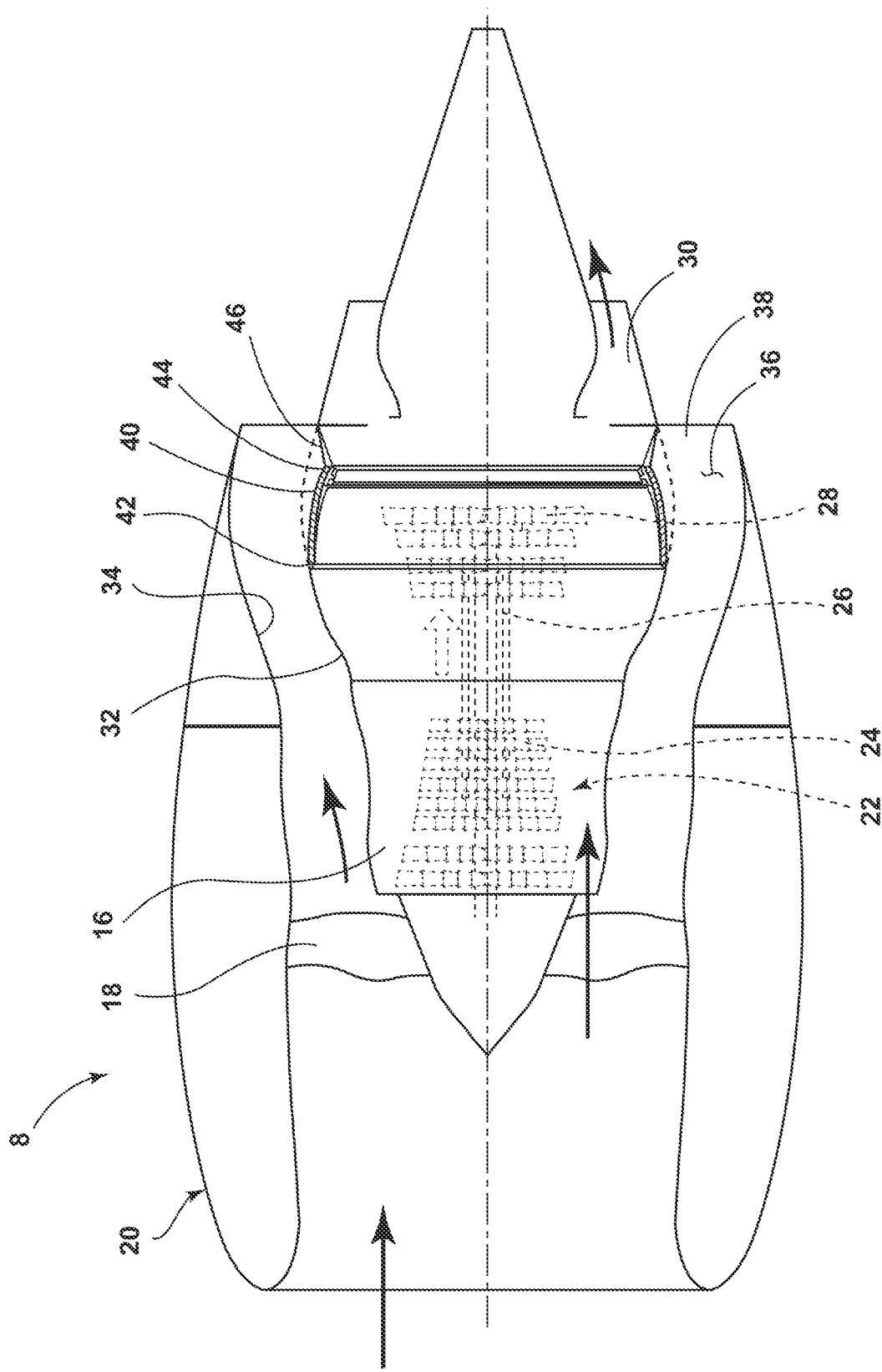
FIG. 2 is a schematic partially cut away view of a turbine engine assembly with a variable area fan nozzle with a control surface in a retracted position, which may be included in the aircraft of FIG. 1.

As illustrated more clearly in FIG. 2, each turbine engine assembly 8 may include a turbine engine 16, a fan assembly 18, and a nacelle 20. The turbine engine 16 includes an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle 38 and a generally forward-to-aft bypass airflow path. It is contemplated that the outer cowl 34 or a portion thereof may translate axially relative to the inner cowl 32 and the engine core 22.

At least one control surface 40 may be provided on the inner cowl 32 and movable between a retracted position, where the nozzle 38 has a first cross-sectional area, and an extended position, shown in phantom, where the nozzle 38 has a second cross-sectional area, which is less than the first cross-sectional area. The first cross-sectional area is sized for take-off operation and the second cross-sectional area is sized for cruise operation. It is contemplated that the first and second cross-sectional areas may be sized in any suitable manner including that the second cross-sectional area may be up to ten percent less than the first cross-sectional area.

Figure 3:
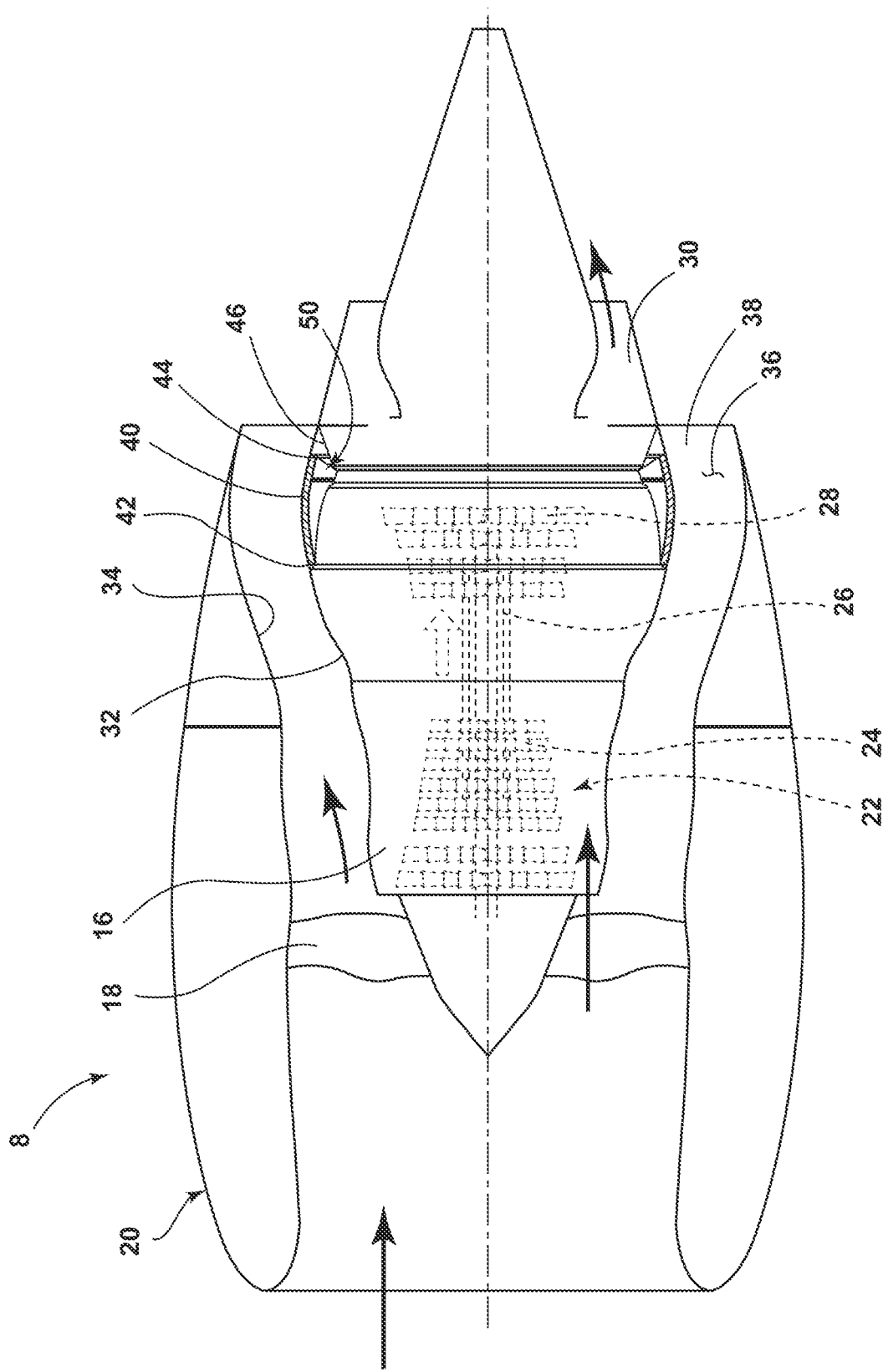
FIG. 3 is a schematic partially cut away view of the engine assembly of FIG. 2 with the control surface in an extended position.

It will be understood that the at least one control surface 40 may be any suitable control surface formed from any suitable material including an acoustically treated surface. By way of further non-limiting example, the control surface 40 may be a door for the inner cowl 32 providing access to the engine core 22. In the illustrated example, the control surface 40 includes a first end 42 that is hingedly mounted to the inner cowl 32 and a second end 44, opposite the first end 42, which moves away from the inner cowl 32 when the control surface 40 moves from the retracted position (FIG. 2) to the extended position (FIG. 3). The first end 42 is forward of the second end 44.

Further still, a seal 46 may be included and may couple the second end 44 to an aft portion of the inner cowl 32. It is contemplated that the seal 46 may be any suitable seal; including that, the seal 46 may be elastic and may be sized to stretch when the control surface 40 is moved from the retracted position (FIG. 2) to the extended position (FIG. 3). In operation, the elastic force of the seal 46 may apply a biasing force to bias the control surface 40 from the extended position (FIG. 3) to the retracted position (FIG. 2). The seal 46 may be formed in any suitable manner from any suitable elastic material including that the seal 46 may be a reinforced elastomeric membrane.

An actuator 50 may be included and may be operably coupled to the control surface 40. The actuator 50 may move the control surface 40 between the retracted position (FIG. 2) and the extended position (FIG. 3) to control the cross-sectional area of the nozzle 38. It will be understood that the actuator 50 may be any suitable type of actuator configured to achieve movement of the control surface 40. As illustrated and by way of non-limiting example, the actuator 50 may include an inflatable airbag, which when inflated hingedly moves the control surface 40 from the retracted position (FIG. 2) to the extended position (FIG. 3). It is contemplated that air pressure from other portions of the turbine engine assembly 8 may be utilized and controlled to inflate the airbag. By way of further non-limiting example, a linear actuator such as a strut may be utilized to move the control surface 40. Thus, it will be understood that the control surface 40 may be moved hydraulically, mechanically, electromechanically, pneumatically, etc.

Further, the control surface 40 may be movable to any number of intermediate positions, between the retracted position (FIG. 2) and the extended position (FIG. 3). The actuator 50 may move the control surface 40 to multiple intermediate positions and may be configured to continuously vary the position of the at least one control surface 40.

Figure 4:
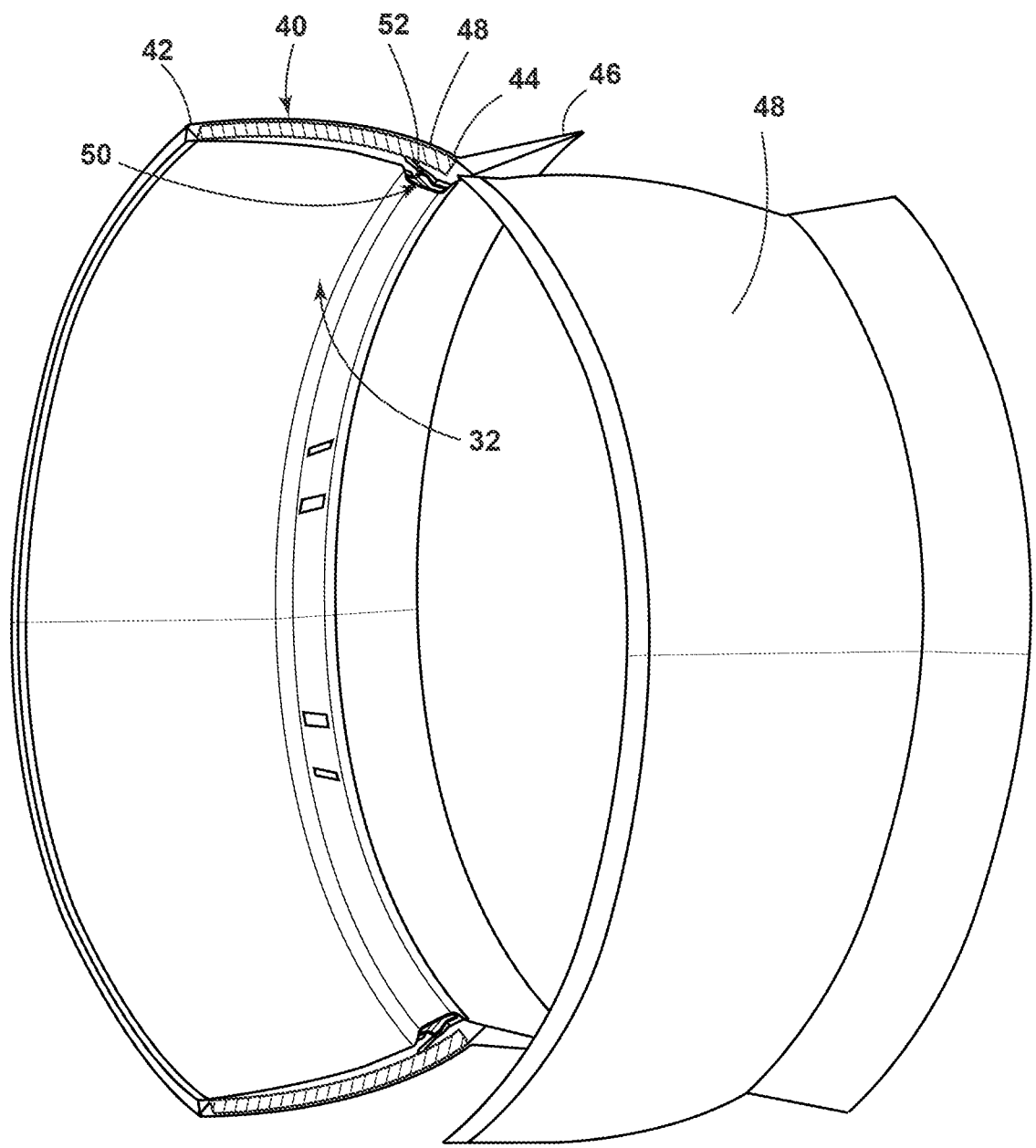
FIG. 4 is a perspective view of an inner cowl with a control surface, as shown in FIG. 2, with the control surface in a retracted position.

FIG. 4 illustrates the inner cowl 32 of FIG. 2 in more detail. As may more clearly be seen, the at least one control surface 40 may include multiple control surfaces 40 radially spaced about the engine core 22. More specifically, the inner cowl 32 has been illustrated as having multiple cowl doors 48, which may be spaced radially about the engine core 22 and movable from a closed position (FIG. 4), where the door 48 is closer to the engine core 22, and an opened position (FIG. 5), where at least one portion of the door 48 is further away from the engine core 22 than the closed position. The cross-sectional area of the nozzle 38 when the door(s) 48 are in the opened position is up to ten percent less than the cross-sectional area when the door(s) 48 are in the closed position.

Figure 5:
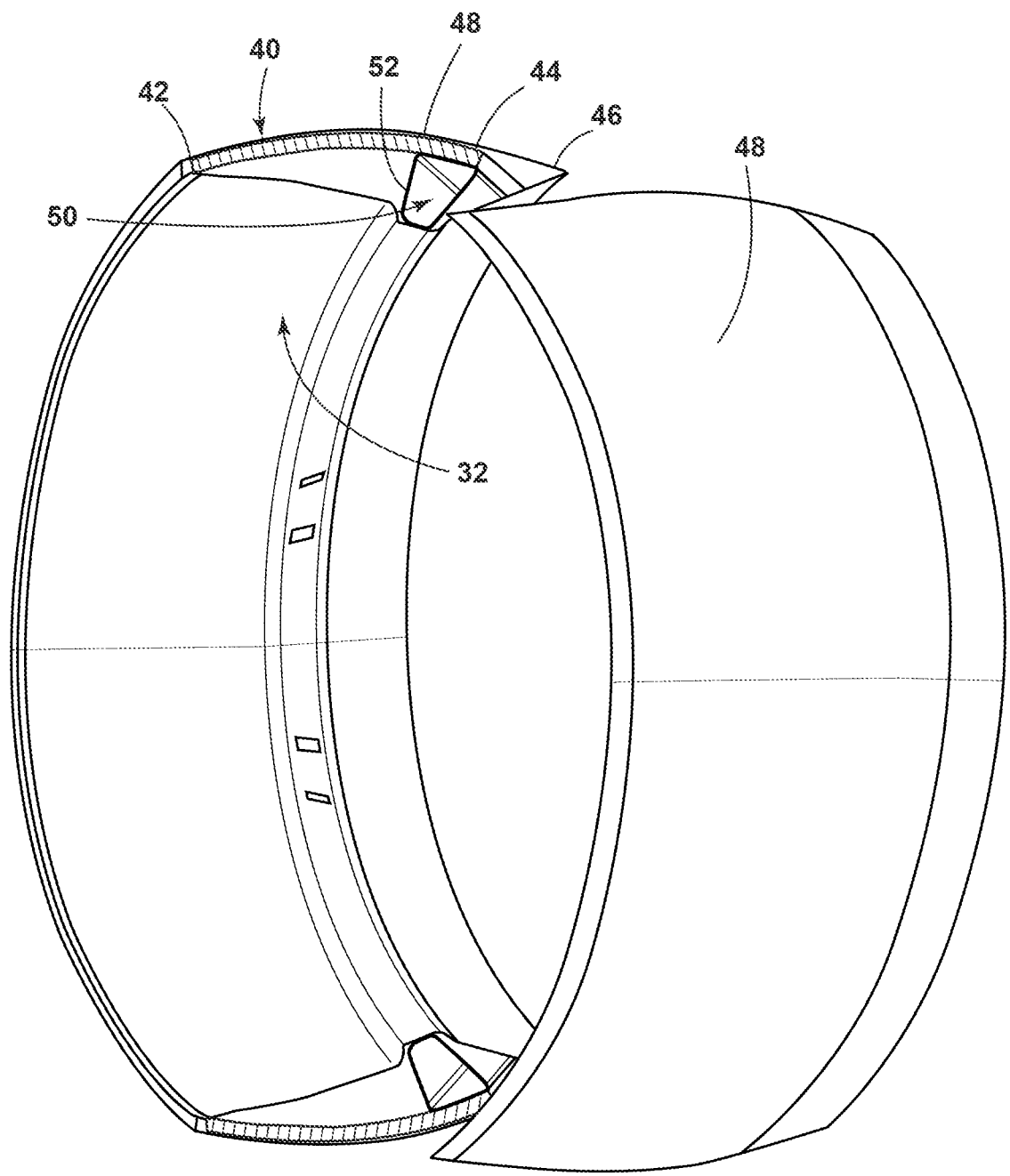
FIG. 5 is a perspective view of the inner cowl and control surface of FIG. 4, with the control surface in an extended position.

Each cowl door 48 includes a first end 42 that is hingedly mounted to the inner cowl 32 and a second end 44, opposite the first end 42, which moves away from the inner cowl 32 when the cowl door 48 moves from the retracted position to the extended position. The seal 46 may be elastic and may be sized to stretch when the cowl door 48 is moved from the closed position (FIG. 4) to the opened position (FIG. 5) and the elastic force of the seal 46 may apply a biasing force to bias the cowl door 48 from the closed position (FIG. 4) to the opened position (FIG. 5). As may more easily be seen in FIG. 5, an inflatable airbag 52 may be located between the between the cowl door(s) 48 and the engine core 22 and form the actuator 50. When the airbag 52 is inflated the door(s) 48 move between the closed and opened position, which reduces the cross-sectional area of the nozzle 38. Further still, the airbag 52 may move the door(s) 48 to any number of intermediate positions to provide for multiple different cross-sectional areas of the nozzle 38.

The embodiments described above provide for a variety of benefits including that a variable area fan nozzle may be achieved, which achieves significant differences in efficiency. The above-described embodiments provide for variable area fan nozzles that avoid the complexity of contemporary systems and without significant impact on basic acoustic or aerodynamic performance. Contemporary variable area fan nozzles typically include complex operating systems and/or mechanisms involving additional flaps or doors, partial in flight deployment of the translating cowl and an associated two-step or multi-step thrust reverser actuation system or an additional independent actuation system. These approaches have operational safety implications, are heavy, complex, and detract from the acoustic and aerodynamic performance of the fan nozzle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine, comprising:
an engine core;
an inner cowl radially surrounding the engine core;
an outer cowl radially surrounding the inner cowl and spaced from the inner cowl to form an annular passage, between the inner cowl and the outer cowl that defines a nozzle;
at least one control surface having a first end hingedly mounted to the inner cowl and a second end, opposite the first end, the at least one control surface movable between a retracted position, where the nozzle has a first cross-sectional area, and an extended position where the second end moves away from the inner cowl and the nozzle has a second cross-sectional area that is less than the first cross-sectional area, the first end forward of the second end;
an actuator operably coupled to the at least one control surface and configured to move the at least one control surface to control the cross-sectional area of the nozzle; and
a seal coupling the second end to the inner cowl, where the seal is elastic and is sized to stretch when the at least one control surface is moved from the retracted position to the extended position.

2. The turbine engine of claim 1 wherein the outer cowl translates axially relative to the engine core.

3. The turbine engine of claim 1 wherein the first cross-sectional area is sized for take-off operation and the second cross-sectional area is sized for cruise operation.

4. The turbine engine of claim 1 wherein the second cross-sectional area is up to ten percent less than the first cross-sectional area.

5. The turbine engine of claim 1 wherein the at least one control surface comprises multiple control surfaces circumferentially spaced about the engine core.

6. The turbine engine of claim 1 wherein the actuator comprises an inflatable airbag and wherein inflation of the inflatable airbag moves the at least one control surface from the retracted position to the extended position.

7. The turbine engine of claim 1 wherein an elastic force of the seal biases the at least one control surface from the extended position to the retracted position.

8. The turbine engine of claim 7 wherein the actuator comprises an inflatable airbag, which when inflated hingedly moves the at least one control surface from the retracted position to the extend position.

9. The turbine engine of claim 8 wherein the at least one control surface provides access from the inner cowl to the engine core.

10. The turbine engine of claim 1 wherein the at least one control surface is movable to at least one intermediate position, between the retracted position and the extended position.

11. The turbine engine of claim 10 wherein the at least one control surface is moveable to multiple intermediate positions and the actuator is configured to continuously vary the position of the at least one control surface.

12. A turbine engine, comprising:
an engine core;
an inner cowl radially surrounding the engine core and having a set of cowl doors, movable from a closed position to an opened position, spaced circumferentially about the engine core, wherein at least one cowl door in the set of cowl doors includes a first end that is hingedly mounted to the inner cowl and a second end, opposite the first end, that moves away from the inner cowl when the at least one cowl door moves from the closed position to the opened position;
an outer cowl radially surrounding the inner cowl and spaced from the inner cowl to form an annular passage, between the inner cowl and the outer cowl, that defines a nozzle having a cross-sectional area;
an elastic seal, sized to stretch when the at least one cowl door is moved from the closed position to the opened position, coupling the second end to the inner cowl; and
at least one inflatable airbag located between a subset of the set of cowl doors and the engine core that when inflated moves the subset of the set of cowl doors towards the opened position, wherein in the opened position the subset of the set of cowl doors reduce the cross-sectional area of the nozzle.

13. The turbine engine of claim 12 wherein in the opened position the subset of the set of cowl doors reduce the cross-sectional area of the nozzle by up to ten percent.

14. The turbine engine of claim 12 wherein the at least one inflatable airbag is configured to move the subset of the set of cowl doors to multiple intermediate positions.

\* \* \* \* \*